United States Patent
Bette et al.

[11] Patent Number: 6,156,447
[45] Date of Patent: Dec. 5, 2000

[54] METHOD FOR IDENTIFYING A GAS LEAK, AND FUEL CELL SYSTEM

[75] Inventors: Willi Bette, Erlangen; Josef Lersch, Heroldsbach, both of Germany

[73] Assignee: Siemens Aktiengesellschaft, Munich, Germany

[21] Appl. No.: 09/322,714

[22] Filed: May 28, 1999

Related U.S. Application Data

[63] Continuation of application No. PCT/DE97/02695, Nov. 17, 1997.

[30] Foreign Application Priority Data

Nov. 28, 1996 [DE] Germany ............ 196 49 436

[51] Int. Cl.$^7$ .................................................. H01M 8/04
[52] U.S. Cl. .................................................. 429/13; 429/23
[58] Field of Search .................................. 429/13, 23

[56] References Cited

U.S. PATENT DOCUMENTS

| | | | |
|---|---|---|---|
| 4,555,452 | 11/1985 | Kahara et al. | 429/23 X |
| 5,045,414 | 9/1991 | Bushnell | 429/23 X |
| 5,178,969 | 1/1993 | Amemiya | 429/26 |
| 5,235,846 | 8/1993 | Fanciullo | 429/13 X |
| 5,397,655 | 3/1995 | Bette et al. | 429/23 X |

FOREIGN PATENT DOCUMENTS

| | | |
|---|---|---|
| 0716463A2 | 6/1996 | European Pat. Off. . |
| 55-154075 | 12/1980 | Japan . |

*Primary Examiner*—Stephen Kalafut
*Attorney, Agent, or Firm*—Herbert L. Lerner; Laurence A. Greenberg; Werner H. Stemer

[57] ABSTRACT

A method for identifying a gas leak between anode and cathode gas areas of a PEM fuel cell includes detecting a cell voltage. The anode and cathode gas areas are purged with nitrogen in a first time period. The cathode gas area is filled with oxygen and the anode gas area is filled with hydrogen in a second time period. A drop in the cell voltage below a limit value as a function of time is then measured and evaluated. The method ensures reliable identification of the gas leak. A fuel cell system operating according to the method is also provided.

11 Claims, 1 Drawing Sheet

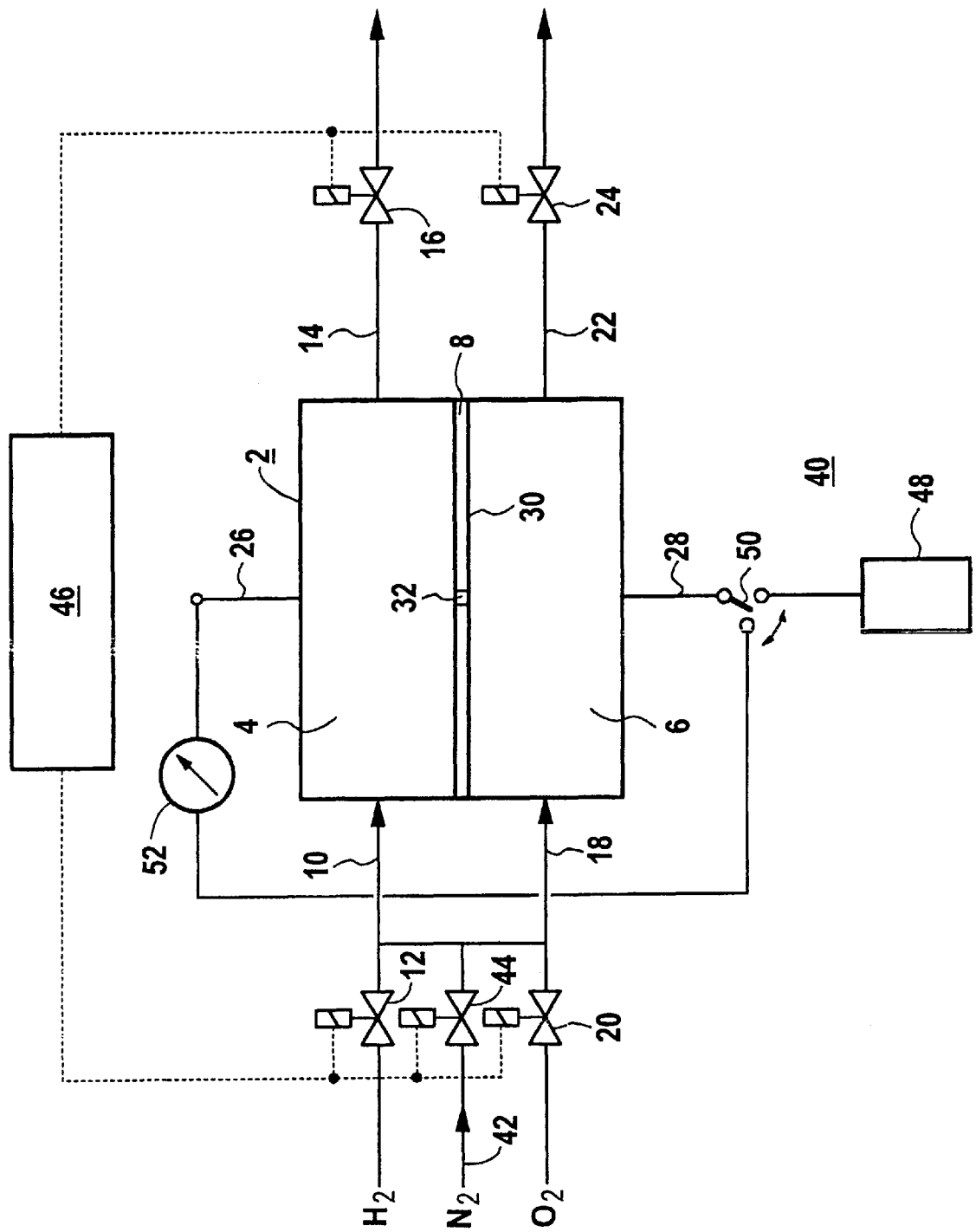

METHOD FOR IDENTIFYING A GAS LEAK, AND FUEL CELL SYSTEM

CROSS-REFERENCE TO RELATED APPLICATION

This application is a continuation of copending International Application Ser. No. PCT/DE97/02695, filed Nov. 17, 1997, which designated the United States.

BACKGROUND OF THE INVENTION

1. Field of the Invention

The invention relates to a method for identifying a gas leak between anode and cathode gas areas of a PEM fuel cell, and to a fuel cell system for carrying out the method.

It is known that during the electrolysis of water, water molecules are broken down by electric currents into hydrogen and oxygen. In the fuel cell, that process takes place in the opposite direction. During the electrochemical combination of hydrogen and oxygen to form water, electric current is produced with high efficiency, and to be precise, if pure hydrogen is used as the combustion gas, that is done without any emission of hazardous materials or carbon dioxide. Even with technical combustion gases, such as natural gas or coal gas, and using air or air enriched with $O_2$ instead of pure oxygen, a fuel cell produces a considerably smaller amount of hazardous materials and less $CO_2$ than other energy producers which operate with fossil energy sources. The technical implementation of the principle of the fuel cell has led to widely differing solutions, to be precise with different types of electrolytes and with operating temperatures between 80° C. and 1000° C. The fuel cells are split into low-temperature, medium-temperature and high-temperature fuel cells depending on their operating temperature and are furthermore respectively distinguished by different technical embodiments.

In addition to those fundamental advantages, a fuel cell having a solid electrolyte composed of plastic (polymer electrolyte membrane or PEM) has other positive characteristics, such as a low operating temperature (less than or equal to 80° C.), a good overload behavior, little voltage degradation, long life, good load and temperature cycling response, and lack of any liquid corrosive electrolyte. Furthermore, it is also suitable for operation with air from the environment, instead of oxygen. All of those characteristics make the PEM fuel cell, which can be operated with air, a virtually ideal electrical source, for example for electrical power for motor vehicles, without any emissions.

A fuel cell block, which is also referred to as a "stack" in the specialist literature, as a rule is composed of a multiplicity of fuel cells stacked on top of each other and having a planar construction. Since the fuel cell block cannot be operated on its own, the fuel cell block, an operating section and an associated electronics module generally are combined to form a fuel cell module. The operating section contains devices for supplying operating material or agents, for example hydrogen ($H_2$), oxygen ($O_2$) or air from the environment, for removing product water, for dissipating heat losses, for moistening the operating material or agents and for extracting inert gas constituents.

During operation of a PEM fuel cell module, any defect that occurs in an individual PEM fuel cell leads to a disturbance in the operation of the entire PEM fuel cell module. For example, a gas escape from an anode gas area to a cathode gas area of the PEM fuel cell due to a leak in a membrane electrode unit can lead to a thermal reaction between hydrogen ($H_2$) and oxygen ($O_2$) being initiated on the catalyst. Rapid identification of the gas leak between the anode and the cathode gas areas and identification of such a defective fuel cell in the fuel cell module following such an occurrence, have been found to be problematic.

In a method known from the prior art for identifying a gas leak between the anode and cathode sides of the fuel cell, a pressure difference is produced between those sides, and a rate of change of the pressure difference is evaluated. Pressures are thus measured in that method. That method uses an integral measurement over a plurality of fuel cells in the fuel cell module, that is to say it is not possible to identify an individual defective fuel cell in the fuel cell module. Furthermore, the method is unsuitable for identifying small leaks in a fuel cell module, due to its low sensitivity.

SUMMARY OF THE INVENTION

It is accordingly an object of the invention to provide a method for identifying a gas leak, and a fuel cell system, which overcome the hereinafore-mentioned disadvantages of the heretofore-known methods and systems of this general type and which have adequate sensitivity for identifying a gas leak between anode and cathode gas areas of a PEM fuel cell.

With the foregoing and other objects in view there is provided, in accordance with the invention, a method for identifying a gas leak between anode and cathode gas areas of a PEM fuel cell by detecting a cell voltage, which comprises purging the anode and cathode gas areas with nitrogen in a first time period; filling the cathode gas area with oxygen and the anode gas area with hydrogen in a second time period; and then measuring and evaluating a drop in the cell voltage below a limit value as a function of time.

The cell voltage U which can be evaluated, between the anode and cathode gas areas, is in the region of the no-load voltage of the PEM fuel cell, of about 1 V. With this cell voltage U which can be evaluated, the method has adequate sensitivity for identifying the gas leak in the PEM fuel cell, thus ensuring technically reliable applicability. Each individual cell can be examined individually using the method. The disadvantage of an integral measurement, where all that can be decided is whether or not a defective cell is within a group of a plurality of cells, but cannot be located accurately, is avoided in this way. The faster the cell voltage U falls below a limit value $U_G$ the greater the probability that there is a leak in the fuel cell.

In accordance with another mode of the invention, the anode gas area and/or the cathode gas area are/is kept closed during the measurement. Therefore, no further operating materials or agents are supplied. Enlargement of any leak which may be present as a consequence of powerful reactions between operating materials or agents continuously supplied to the fuel cell is prevented.

In accordance with a further mode of the invention, there is provided a method which comprises removing the nitrogen from the anode and cathode gas areas between the first and second time periods.

In accordance with an added mode of the invention, there is provided a method which comprises carrying out the step of filling the cathode gas area with oxygen during the second time period, for about 1 s at an absolute pressure of about 2.3 bar.

In accordance with an additional mode of the invention, the majority of the oxygen ($O_2$) can be removed from the cathode gas area between the first and the second time periods. All that remains in the cathode gas area is residual oxygen ($O_2$) which adheres to the cathode. The time interval for the measurement can thus be shortened and, in consequence, any enlargement of the leak due to powerful chemical reactions which would otherwise occur can essentially be avoided.

In accordance with yet another mode of the invention, the limit value $U_G$ for the cell voltage U is set to about half the no-load voltage of the PEM fuel cell. Half the no-load voltage is about 0.5 V.

In accordance with yet a further mode of the invention, if the cell voltage U falls below the limit value $U_G$ within a time period of 15 to 20 s, in particular within 16 s, then it can be reliably assumed that the fuel cell has a leak. In a serviceable fuel cell without a leak, the cell voltage would take at least 50 s to fall below the limit value $U_G$. A defective fuel cell can thus clearly be identified by using the method.

In accordance with yet an added mode of the invention, there is provided a method which comprises carrying out the step of filling the anode gas area with hydrogen during the second time period, for about 0.1 s at an absolute pressure of about 2.0 bar.

With the objects of the invention in view, there is also provided a fuel cell system, comprising a PEM fuel cell having connections for supplying nitrogen and for tapping off electrical voltage, and a controller for carrying out the method, that is to say for supplying the nitrogen and for checking and measuring the cell voltage.

Other features which are considered as characteristic for the invention are set forth in the appended claims.

Although the invention is illustrated and described herein as embodied in a method for identifying a gas leak, and a fuel cell system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic and block diagram of a PEM fuel cell system.

DESCRIPTION OF THE PREFERRED EMBODIMENTS

Referring now in detail to the single FIGURE of the drawing, there is seen a fuel cell system 40 which includes a PEM fuel cell 2 that has an anode gas area 4 and a cathode gas area 6. The respective anode and cathode gas areas 4 and 6 are separated from one another by a membrane electrode unit 8.

Operating materials or agents are supplied to and extracted from the anode gas area 4 through a supply pipe 10 having a first controllable valve 12, and through an outlet pipe 14 having a second controllable valve 16. Operating materials or agents are supplied to and extracted from the cathode gas area 6 in a corresponding manner through a supply pipe 18 having a third controllable valve 20, and through an outlet pipe 22 having a fourth controllable valve 24. The cell 2 can be purged with nitrogen ($N_2$) through a further supply pipe 42 having a fifth controllable valve 44. The supply pipe 42 bifurcates and opens into the supply pipes 10, 18. The pipes 10, 14, 18, 22, 42 can be considered first connections to the cell 2.

The controllable valves 12, 16, 20, 24 and 44 in the first connections are connected to a controller 46 for carrying out the method.

Electric current produced in the cell 2 is fed through an electrical cable 28 to a load 48 for further use. The electrical cable 28 contains an electric switch 50, through which the electric current flows out of the cell 2 when the switch 50 is closed. When the switch 50 is open, an electrical cell voltage U of the cell 2 can be measured through an electrical cable 26 having a voltmeter 52 connected therein, without any electric current flowing. The cables 26, 28 can be considered second connections to the cell 2.

A method for identifying a gas leak 32 between the respective anode and cathode gas areas 4 and 6 in the membrane electrode unit 8, includes purging the respective anode and cathode gas areas 4 and 6 with nitrogen ($N_2$) in first time period. This measure results in an inert state being achieved in the respective anode and cathode gas areas 4 and 6. Another inert gas can also be used to achieve this inert state. The controllable valves 44, 16 and 24 are open in the first time period.

The nitrogen ($N_2$) is then removed from the cell 2, for example by pumping it out, through the outlet pipes 14 and 22.

In a second time period, which follows the first time period in time, the cathode gas area 6 is filled for about 1 s with oxygen ($O_2$) at an absolute pressure of about 2.3 bar.

Subsequently, the valve 20 in the supply pipe 18 for the cathode gas area 6 is closed, in order to prevent any further oxygen ($O_2$) from being supplied. The oxygen ($O_2$) is then virtually completely removed through the outlet pipe 22, and the valve 24 in the outlet pipe 22 is then closed. A residual amount of oxygen ($O_2$) remains on the cathode 30 of the membrane electrode unit 8 as a result of adsorption. That residual amount has not been removed from the cathode gas area 6.

The anode gas area 4 is filled with hydrogen ($H_2$) for about 0.1 s at an absolute pressure of about 2.0 bar in a second time period, with the valve 16 closed. After filling, the valve 12 in the supply pipe 10 is closed. This measure results in the amount of hydrogen ($H_2$) which can react being limited to the volume of the anode gas area 4 and associated sections of the supply pipe 10 and of the outlet pipe 14.

After completion of this procedure, the valves 12, 16, 20, 24 and 44 are closed, and the cell 2 is isolated from its environment in a gas-tight manner.

When the fuel cell system 40 is in this state, the cell voltage U of the cell 2 is measured with the switch 50 open, that is to say with no electric current flowing. The measurement should be started in each case immediately after the second time period.

The cell voltage U, that is to say the no-load voltage, has a value of about 1 V at the start of the measurement. If the cell 2 has no gas leak in the membrane electrode unit 8, then the cell voltage U falls to 0 V within a time period of about 1 min. In contrast, if the cell 2 has a gas leak, then the voltage falls considerably faster, since the hydrogen ($H_2$) in the anode gas area 4 reacts directly with the oxygen ($O_2$) in the cathode gas area 6. The criterion for the presence of a gas leak is thus defined as the cell voltage U falling below a limit value $U_G$, which is considerably less than the no-load voltage, within a predetermined time interval that is considerably less than 1 min.

This time period should be between 15 and 20 s. A time period of 16 s, in particular, has been proven in practice, wherein the limit value $U_G$ is about half the no-load voltage, that is to say about 0.5 V. Thus, if the cell voltage U falls below this limit value $U_G$ within this time period, then there is a gas leak 32 in the cell 2.

The method has adequately high sensitivity due to the fact that the cell voltage U which can be evaluated is in the region of the no-load voltage. In a fuel cell block which includes a number of cells, the method can also be applied to a number of cells (up to 5, for example) connected in series. In fact, in this case, all that can be decided is whether or not there is a defective cell in this group of cells. The limit value $U_G$ must then be adapted to correspond to the number of cells in the group to be examined.

We claim:

1. In a method for identifying a gas leak between anode and cathode gas areas of a PEM fuel cell by detecting a cell voltage, the improvement which comprises:

purging the anode and cathode gas areas with nitrogen in a first time period;

filling the cathode gas area with oxygen and the anode gas area with hydrogen in a second time period; and then measuring and evaluating the cell voltage as a function of time.

2. The method according to claim 1, which comprises keeping at least one of the anode and cathode gas areas closed during the measuring step.

3. The method according to claim 1, which comprises removing the nitrogen from the anode and cathode gas areas between the first and second time periods.

4. The method according to claim 1, which comprises carrying out the step of filling the cathode gas area with oxygen during the second time period, for about 1 s at an absolute pressure of about 2.3 bar.

5. The method according to claim 1, which comprises removing a majority of the oxygen after the second time period.

6. The method according to claim 1, which comprises monitoring the cell voltage to about half of a no-load voltage of the PEM fuel cell.

7. The method according to claim 1, which comprises monitoring the cell voltage to about 0.5 V.

8. The method according to claim 1, which comprises carrying out the step of measuring the cell voltage for 15 to 20 s.

9. The method according to claim 1, which comprises carrying out the step of measuring the cell voltage for about 16 s.

10. The method according to claim 1, which comprises carrying out the step of filling the anode gas area with hydrogen during the second time period, for about 0.1 s at an absolute pressure of about 2.0 bar.

11. A fuel cell system, comprising:

a PEM fuel cell having anode and cathode gas areas;

first connections for supplying nitrogen, oxygen and hydrogen to and removing nitrogen, oxygen and hydrogen from said PEM fuel cell;

a second connection for tapping off electrical voltage from said PEM fuel cell; and a controller connected to said first connections and programmed to:

purge the anode and cathode gas areas with nitrogen in a first time period;

fill the cathode gas area with oxygen and the anode gas area with hydrogen in a second time period; and subsequently measure and evaluate the cell voltage as a function of time.

* * * * *